US008484210B2

(12) United States Patent
Loh et al.

(10) Patent No.: US 8,484,210 B2
(45) Date of Patent: Jul. 9, 2013

(54) REPRESENTING MARKUP LANGUAGE DOCUMENT DATA IN A SEARCHABLE FORMAT IN A DATABASE SYSTEM

(75) Inventors: Tat-Keong Loh, Singapore (SG); Xiao Ming Zhou, Singapore (SG); Mohyuddin Rehmattullah, Fremont, CA (US); Michelle Lim, Singapore (SG)

(73) Assignee: Sybase, Inc., Dublin, CA (US)

( * ) Notice: Subject to any disclaimer, the term of this patent is extended or adjusted under 35 U.S.C. 154(b) by 664 days.

(21) Appl. No.: 12/488,358

(22) Filed: Jun. 19, 2009

(65) Prior Publication Data

US 2010/0325169 A1   Dec. 23, 2010

(51) Int. Cl.
*G06F 7/00* (2006.01)
*G06F 17/30* (2006.01)

(52) U.S. Cl.
CPC . *G06F 7/00* (2013.01); *G06F 17/30* (2013.01)
USPC ............................. 707/736; 707/755; 707/756

(58) Field of Classification Search
None
See application file for complete search history.

(56) References Cited

U.S. PATENT DOCUMENTS

| 6,799,184 | B2 | 9/2004 | Bhatt et al. | |
|---|---|---|---|---|
| 7,493,305 | B2 | 2/2009 | Thusoo et al. | |
| 2005/0068207 | A1* | 3/2005 | Su et al. | 341/63 |
| 2006/0167869 | A1* | 7/2006 | Jones | 707/4 |
| 2006/0167907 | A1* | 7/2006 | Jones | 707/100 |
| 2010/0312756 | A1 | 12/2010 | Zhang et al. | |
| 2011/0131200 | A1 | 6/2011 | Zhou et al. | |

OTHER PUBLICATIONS

Bray et al., "Extensible Markup Language (XML) 1.0—W3C Recommendation," W3C.org, last accessed on Apr. 2, 2012 at http://www.w3.org/TR/2000/REC-xml-20001006, Second Edition, Oct. 6, 2000.
Berglund et al., "XML Path Language (Xpath) Version 2.0—W3C Recommendation," W3C.org, last accessed on Apr. 2, 2012 at http://www.w3.org/TR/2007/REC-xpath20-20070123/, Jan. 23, 2007.
Information Technology—Database Languages—SQL—Parts 1-5, published by the American National Standards Institute as American National Standard INCITS/ISO/IEC 9075-(1-5)-1999.
Date, C.J., "An Introduction to Database Systems, Seventh Edition," Part I, Chapters 1-4, Addison Wesley, 2000.
Office Action mailed Oct. 3, 2011, in U.S. Appl. No. 12/628,458, inventors Zhou et al, filed Dec. 1, 2009.
Co-pending Application, U.S. Appl. No. 13/305,931 inventor Mohyuddin Rehmattullah, filed on Nov. 29, 2011 (Not Published).

\* cited by examiner

*Primary Examiner* — Jay Morrison
(74) *Attorney, Agent, or Firm* — Sterne, Kessler, Goldstein & Fox PLLC

(57) ABSTRACT

Systems, methods, computer program product embodiments for representing markup language document data in a searchable format in a database system are provided. An embodiment includes parsing a markup language document into a data stream, the data stream including a plurality of fields in a predefined format having a symbol table for at least one field of the data stream, and optimized field size based on a maximum value of data within each field, and storing the data stream in data storage.

23 Claims, 9 Drawing Sheets

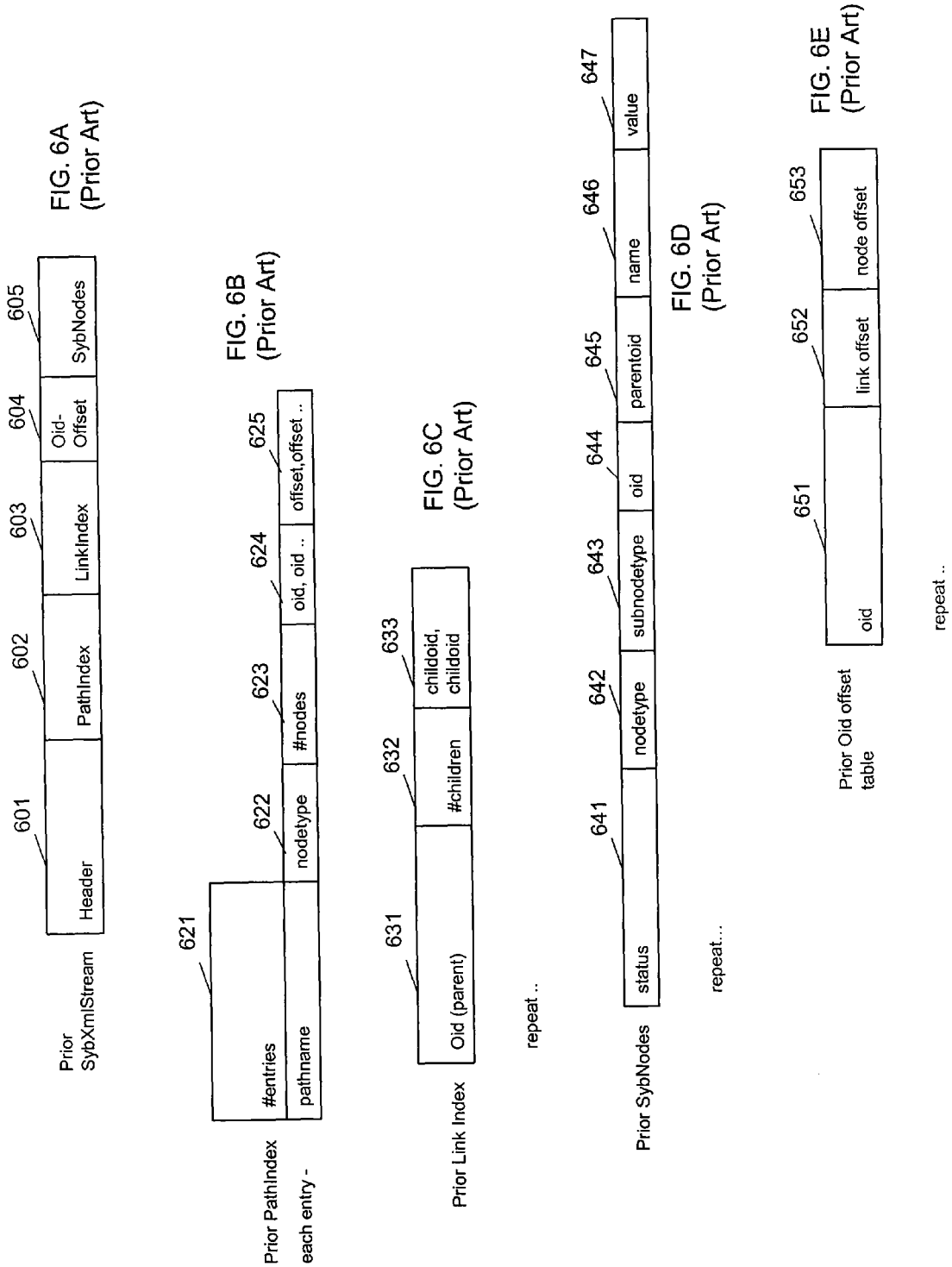

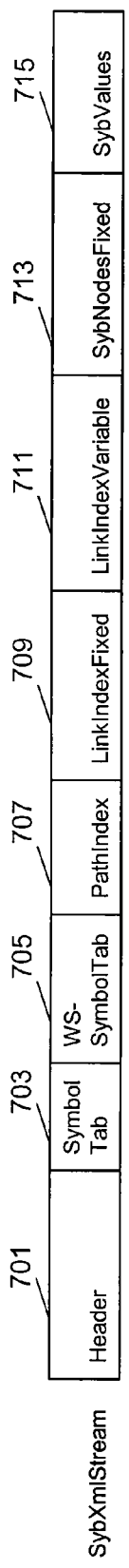
FIG. 7A
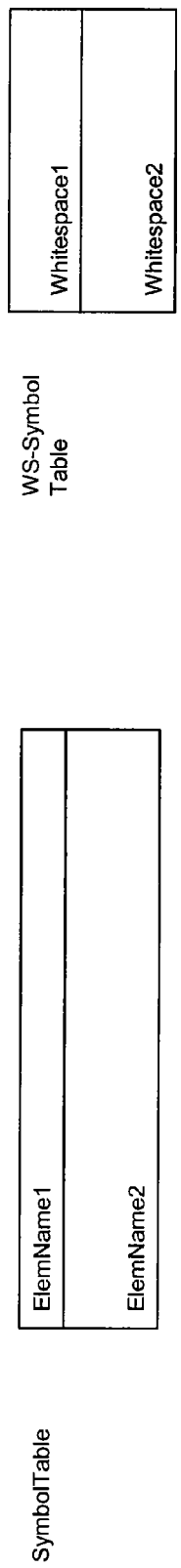
FIG. 7B
FIG. 7C
FIG. 7D

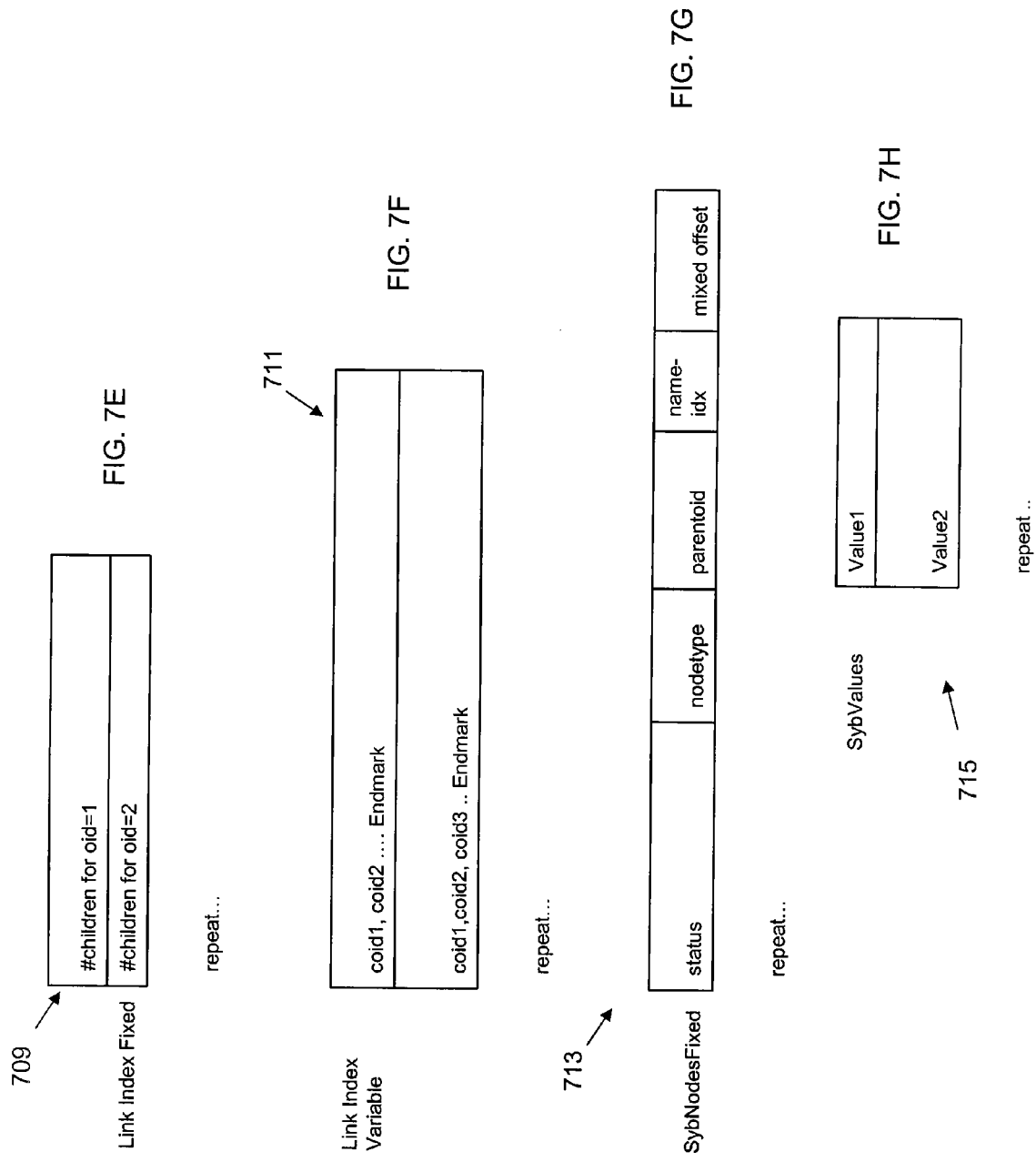

REPRESENTING MARKUP LANGUAGE DOCUMENT DATA IN A SEARCHABLE FORMAT IN A DATABASE SYSTEM

FIELD OF THE INVENTION

The present invention relates generally to data processing environments and, more particularly, to representing markup language document data in a searchable format in a database system.

BACKGROUND

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee, such as name, home address, salary, and the like.

Between the actual physical database itself (i.e., the data actually stored on a storage device) and the users of the system, a database management system or DBMS is typically provided as a software cushion or layer. In essence, the DBMS shields the database user from knowing or even caring about the underlying hardware-level details. Typically, all requests from users for access to the data are processed by the DBMS. For example, information may be added or removed from data files, information retrieved from or updated in such files, and so forth, all without user knowledge of the underlying system implementation. In this manner, the DBMS provides users with a conceptual view of the database that is removed from the hardware level. The general construction and operation of database management systems is well known in the art. See e.g., Date, C., "An Introduction to Database Systems, Seventh Edition", Part I (especially, Chapters 1-4), Addison Wesley, 2000.

In recent years, applications running on database systems frequently provide for business-to-business or business-to-consumer interaction via the Internet between the organization hosting the application and its business partners and customers. Today, many organizations receive and transmit considerable quantities of information to business partners and customers through the Internet. A considerable portion of the information received or exchanged is in Extensible Markup Language or "XML" format. XML is a pared-down version of SGML (Standard Generalized Markup Language), designed especially for Web documents, which allows designers to create their own customized tags, enabling the definition, transmission, validation, and interpretation of data between applications and between organizations. For further description of XML, see e.g., "Extensible Markup Language (XML) 1.0" (Second Edition, Oct. 6, 2000) a recommended specification from the W3C, the disclosure of which is hereby incorporated by reference. A copy of this specification is available via the Internet (e.g., currently at www.w3.org/TR/2000/REC-xml-20001006). Many organizations utilize XML to exchange data with other remote users over the Internet.

Given the increasing use of XML in recent years, many organizations now have considerable quantities of data in XML format, including Web documents, newspaper articles, product catalogs, purchase orders, invoices, and product plans. As a result, these organizations need to be able to efficiently store, maintain, and use this XML information in an efficient manner. However, this XML data is not in a format that can be easily stored and searched in current database systems. Most XML data is sent and stored in plain text format. This data is not formatted in tables and rows like information stored in a relational DBMS. To search this semi-structured data, users typically utilize keyword searches similar to those utilized by many current Internet search engines. These keyword searches are resource-intensive and are not as efficient as relational DBMS searches of structured data.

Organizations with data in XML format also typically have other enterprise data stored in a structured format in database management systems. Increasingly, database system users are demanding that database systems provide the ability to access and use both structured data stored in these databases as well as XML and other unstructured or semi-structured data. In addition, users desire flexible tools and facilities for performing searches of this data.

One of the key roles of a database management system (DBMS) is to retrieve data stored in a database based on specified selection criterion. This typically involves retrieving data in response to a query that is specified in a query language. One particular need is for a solution that will enable efficient searches of information in XML documents. For instance, it would be desirable to have an XML version of SQL (Structured Query Language) that would enable a user to easily retrieve all nodes of type X that have descendants of type Y from an XML document.

One current solution used in XML-based applications to query the contents of an XML document is XPath. The XPath query language is commonly used in Extensible Stylesheet Language Transformations (XSLT) to locate and to apply XSLT templates to specific nodes in an XML document. XPath queries are also commonly used to locate and to process nodes in an XML document that match a specified criteria. XPath provides basic facilities for manipulation of strings, numbers and Booleans. It uses a compact, non-XML syntax to facilitate use of XPath within URLs and XML attribute values. XPath operates on the abstract, logical structure of an XML document, rather than its surface syntax. XPath gets its name from its use of a path notation as in URLs for navigating through the hierarchical structure of an XML document. For further description of XPath, see e.g., "XML Path Language (XPath) Version 2.0" (Jan. 23, 2007), a recommended specification from the W3C, the disclosure of which is hereby incorporated by reference. A copy of this specification is available via the Internet (e.g., currently at http://www.w3.org/TR/xpath20/).

To extract information embedded in XML data efficiently, native binary store of the XML data in database system tables has been used. However, with the size of the XML file becoming bigger and bigger, a more concise format is needed to reduce the size of the native XML binary. The present invention addresses this need.

BRIEF SUMMARY

Briefly stated, the invention includes system, method, computer program product embodiments and combinations and sub-combinations thereof for representing markup language document data in a searchable format in a database system are provided. An embodiment includes parsing a markup language document into a data stream, the data stream including a plurality of fields in a predefined format having a symbol table for at least one field of the data stream, and optimized field size based on a maximum value of data within each field, and storing the data stream in data storage.

Further embodiments, features, and advantages of the invention, as well as the structure and operation of the various embodiments of the invention are, described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

FIGS. 6A, 6B, 6C, 6D, 6E illustrate a prior art format of an XMLStreamObject.

FIGS. 7A, 7B, 7C, 7D, 7E, 7F, 7G, and 7H illustrate a format of an XMLStreamObject in accordance with the present invention.

Figure 1:
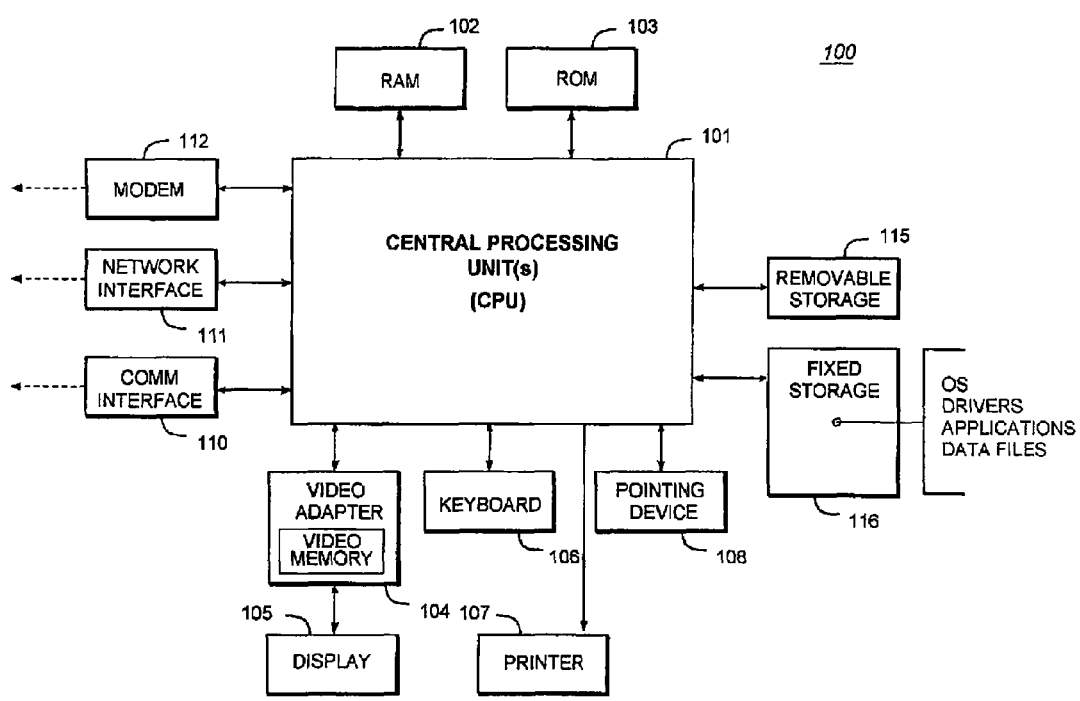
FIG. 1 is a very general block diagram of a computer system (e.g., an IBM-compatible system) in which software-implemented processes of the present invention may be embodied.

The features and advantages of the present invention will become more apparent from the detailed description set forth below when taken in conjunction with the drawings.

DETAILED DESCRIPTION

While embodiments are described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility. The following sections describe an active/push notification facade for a passive database in further detail.

Different embodiments will be described herein applied to different types of passive databases. It is important to note that, while certain embodiments herein are applied to passive email system databases, the teachings may be applied to a variety of different types of passive databases.

GLOSSARY

The following definitions are offered for purposes of illustration, not limitation, in order to assist with understanding the discussion that follows.

HTML: HTML stands for HyperText Markup Language, the authoring language used to create documents on the World Wide Web. HTML defines the structure and layout of a Web document by using a variety of tags and attributes.

Node: In the context of a markup language document (e.g., an XML document), a node corresponds to an element or value in the markup language document. Unlike conventional data in a database (e.g., relational database) which is maintained in a flat structure, information in a markup language document (e.g., XML document) can be represented as a tree structure. The tree structure of an XML document is generated by transforming each element or value in the XML document into a node in the tree.

Path scan: A path scan returns identifiers of all the nodes that follow a given XPath. In the system of the present invention, a path scan invokes services of a store layer.

Physical query operator (operator): One step in an execution plan is called an operator. The implementation of the execution for one step in the plan (operator) is called the "physical" operator.

Query: A request for information from a database. A database query is typically written in a database query language, which is a language enabling database users to interactively formulate requests and generate reports. One of the best known query languages is the Structured Query Language (SQL).

Query engine: A query engine is a significant component of a DBMS, which in the currently preferred embodiment of the present invention is comprised of the following sub-components: a parser, a normalization engine, an optimizer/compiler, and an execution engine. The parser converts query text to a query tree and imposes syntactic correctness. The normalization engine enforces semantic correctness by validating the correctness of information in the query. It also transforms the query into an operator tree or query that is in a form which facilitates processing by other sub-components of the query engine. An optimizer chooses the best among various alternative plans for executing a query. A compiler generates another structure that enumerates the specific execution steps in the appropriate order of execution. In this document the XML engine optimizer and compiler are together referred to as the optimizer, unless otherwise indicated. The last sub-component of the query engine is the execution engine which is a virtual machine within a DBMS that interprets the "plan language". The execution engine executes all the sub-commands necessary to execute the query and return results.

Query plan: A query plan (execution plan or "plan") is an in-memory data-structure which contains the specific steps (operations) and order of execution for a given query. A query plan is written in a language that the execution engine understands.

Query processing: All phases of query evaluation, parsing, normalization, optimization/compilation, execution, and result generation, together are termed as "query processing". The life of a query includes all of these phases.

Query tree: A query tree is an in-memory data-structure which represents a query. Initially, it is a mirror of "query text" in the form of an in-memory data-structure. It includes the same information as in the user query.

Relational database: A relational database is a collection of data items organized as a set of formally-described tables from which data can be accessed or reassembled in many different ways without having to reorganize the database tables. The relational database was invented by E. F. Codd at IBM in 1970. A relational database employs a set of tables containing data fitted into predefined categories. Each table (which is sometimes called a relation) contains one or more data categories in columns. The standard user and application program interface to a relational database is the structured query language (SQL), defined below.

SQL: SQL stands for Structured Query Language. The original version called SEQUEL (structured English query language) was designed by IBM in the 1970's. SQL-92 (or SQL/92) is the formal standard for SQL as set out in a document published by the American National Standards Institute in 1992; see e.g., "Information Technology—Database languages—SQL", published by the American National Standards Institute as American National Standard ANSI/ISO/IEC 9075: 1992, the disclosure of which is hereby incorporated by reference. SQL-92 was superseded by SQL-99 (or SQL3) in 1999; see e.g., "Information Technology—Database Languages—SQL, Parts 1-5" published by the American National Standards Institute as American National Standard INCITS/ISO/IEC 9075-(1-5)-1999 (formerly ANSI/ISO/IEC 9075-(1-5) 1999), the disclosure of which is hereby incorporated by reference.

Storage layer: A storage layer is a component of a DBMS which provides services to the query engine such as running a scan and extracting data from disk to in-memory buffers, storing data from in-memory buffers to disk, and so forth.

URL: URL is an abbreviation of Uniform Resource Locator, the global address of documents and other resources on the World Wide Web. The first part of the address indicates what protocol to use, and the second part specifies the IP address or the domain name where the resource is located.

XML: XML stands for Extensible Markup Language, a specification developed by the World Wide Web Consortium (W3C). XML is a pared-down version of the Standard Generalized Markup Language (SGML), a system for organizing and tagging elements of a document. XML is designed especially for Web documents. It allows designers to create their own customized tags, enabling the definition, transmission, validation, and interpretation of data between applications and between organizations.

XPath: XPath is a query language for querying data in XML documents. The XPath query language is commonly used in Extensible Stylesheet Language Transformations (XSLT) to locate and to apply XSLT templates to specific nodes in an XML document. XPath queries are also commonly used to locate and to process nodes in an XML document that match a specified criteria. XPath provides basic facilities for manipulation of strings, numbers, and Booleans. It uses a compact, non-XML syntax to facilitate use of XPath within URLs and XML attribute values. XPath operates on the abstract, logical structure of an XML document, rather than its surface syntax. XPath gets its name from its use of a path notation as in URLs for navigating through the hierarchical structure of an XML document.

Introduction

Referring to the figures, exemplary embodiments of the invention will now be described. The following description will focus on the presently preferred embodiment of the present invention, which is implemented in desktop and/or server software (e.g., driver, application, or the like) operating in an Internet-connected environment running under an operating system, such as the Microsoft Windows operating system. The present invention, however, is not limited to any one particular application or any particular environment. Instead, those skilled in the art will find that the system and methods of the present invention may be advantageously embodied on a variety of different platforms, including Macintosh, Linux, Solaris, UNIX, FreeBSD, and the like. Therefore, the description of the exemplary embodiments that follows is for purposes of illustration and not limitation. The exemplary embodiments are primarily described with reference to block diagrams or flowcharts. As to the flowcharts, each block within the flowcharts represents both a method step and an apparatus element for performing the method step. Depending upon the implementation, the corresponding apparatus element may be configured in hardware, software, firmware, or combinations thereof.

Computer-Based Implementation

Basic System Hardware (e.g., For Desktop and Server Computers)

The present invention may be implemented on a conventional or general-purpose computer system, such as an IBM-compatible personal computer (PC) or server computer. FIG. 1 is a very general block diagram of a computer system (e.g., an IBM-compatible system) in which software-implemented processes of the present invention may be embodied. As shown, system 100 comprises a central processing unit(s) (CPU) or processor(s) 101 coupled to a random-access memory (RAM) 102, a read-only memory (ROM) 103, a keyboard 106, a printer 107, a pointing device 108, a display or video adapter 104 connected to a display device 105, a removable (mass) storage device 115 (e.g., floppy disk, CD-ROM, CD-R, CD-RW, DVD, or the like), a fixed (mass) storage device 116 (e.g., hard disk), a communication (COMM) port(s) or interface(s) 110, a modem 112, and a network interface card (NIC) or controller 111 (e.g., Ethernet). Although not shown separately, a real time system clock is included with the system 100, in a conventional manner.

CPU 101 comprises a processor, such as one of the Intel Pentium family of microprocessors or any other suitable processor that may be utilized for implementing the present invention. The CPU 101 communicates with other components of the system via a bi-directional system bus (including any necessary input/output (I/O) controller circuitry and other "glue" logic). The bus, which includes address lines for addressing system memory, provides data transfer between and among the various components. Random-access memory (RAM) 102 serves as the working memory for the CPU 101. The read-only memory (ROM) 103 contains the basic input/output system code (BIOS)—a set of low-level routines in the ROM that application programs and the operating systems can use to interact with the hardware, including reading characters from the keyboard, outputting characters to printers, and so forth.

Mass storage devices 115, 116 provide persistent storage on fixed and removable media, such as magnetic, optical or magnetic-optical storage systems, flash memory, or any other available mass storage technology. The mass storage may be shared on a network, or it may be a dedicated mass storage. As shown in FIG. 1, fixed storage 116 stores a body of program and data for directing operation of the computer system, including an operating system, user application programs, driver and other support files, as well as other data files of all sorts. Typically, the fixed storage 116 serves as the main hard disk for the system.

In basic operation, program logic (including that which implements methodology of the present invention described below) is loaded from the removable storage 115 or fixed storage 116 into the main (RAM) memory 102, for execution by the CPU 101. During operation of the program logic, the system 100 accepts user input from a keyboard 106 and pointing device 108, as well as speech-based input from a voice recognition system (not shown). The keyboard 106 permits selection of application programs, entry of keyboard-based input or data, and selection and manipulation of individual data objects displayed on the screen or display device 105. Likewise, the pointing device 108, such as a mouse, track ball, pen device, or the like, permits selection and manipulation of objects on the display device. In this manner, these input devices support manual user input for any process running on the system.

The computer system 100 displays text and/or graphic images and other data on the display device 105. The video adapter 104, which is interposed between the display device 105 and the system's bus, drives the display device 105. The video adapter 104, which includes video memory accessible to the CPU 101, provides circuitry that converts pixel data stored in the video memory to a raster signal suitable for use by a display device, such as a cathode ray tube (CRT) raster or liquid crystal display (LCD) monitor. A hard copy of the displayed information, or other information within the system 100, may be obtained from the printer 107, or other output device.

The system itself communicates with other devices (e.g., other computers) via the network interface card (NIC) 111 connected to a network (e.g., Ethernet network, Bluetooth wireless network, or the like), and/or modem 112 (e.g., 56K baud, ISDN, DSL, or cable modem). The system 100 may also communicate with local occasionally-connected devices (e.g., serial cable-linked devices) via the communication (COMM) interface 110, which may include a RS-232 serial port, a Universal Serial Bus (USB) interface, or the like. Devices that will be commonly connected locally to the interface 110 include laptop computers, handheld organizers, digital cameras, and the like.

Basic System Software

Figure 2:
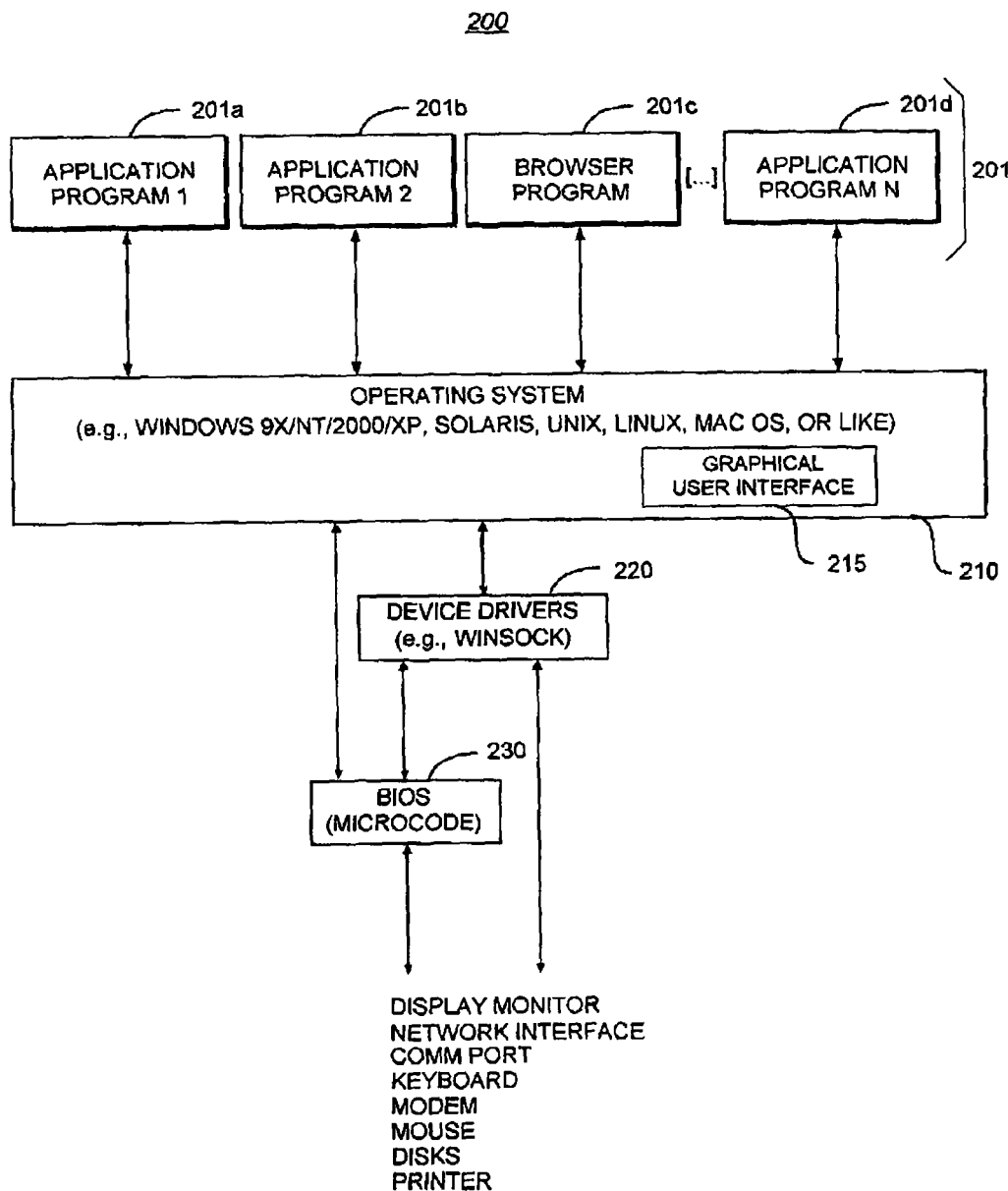
FIG. 2 is a block diagram of a software system for controlling the operation of the computer system.

FIG. 2 is a block diagram of a software system for controlling the operation of the computer system 100. As shown, a computer software system 200 is provided for directing the operation of the computer system 100. Software system 200, which is stored in system memory (RAM) 102 and on fixed storage (e.g., hard disk) 116, includes a kernel or operating system (OS) 210. The OS 210 manages low-level aspects of computer operation, including managing execution of processes, memory allocation, file input and output (I/O), and device I/O. One or more application programs, such as client application software or "programs" 201 (e.g., 201*a*, 201*b*, 201*c*, 201*d*) may be "loaded" (i.e., transferred from fixed storage 116 into memory 102) for execution by the system 100. The applications or other software intended for use on the computer system 100 may also be stored as a set of downloadable processor-executable instructions, for example, for downloading and installation from an Internet location (e.g., Web server).

Software system 200 includes a graphical user interface (GUI) 215, for receiving user commands and data in a graphical (e.g., "point-and-click") fashion. These inputs, in turn, may be acted upon by the system 100 in accordance with instructions from operating system 210, and/or client application module(s) 201. The GUI 215 also serves to display the results of operation from the OS 210 and application(s) 201, whereupon the user may supply additional inputs or terminate the session. Typically, the OS 210 operates in conjunction with device drivers 220 (e.g., "Winsock" driver—Windows' implementation of a TCP/IP stack) and the system BIOS microcode 230 (i.e., ROM-based microcode), particularly when interfacing with peripheral devices. OS 210 can be provided by a conventional operating system, such as Microsoft (registered trademark) Windows 9x, Microsoft (registered trademark) Windows NT, Microsoft (registered trademark) Windows 2000, or Microsoft (registered trademark) Windows XP, all available from Microsoft Corporation of Redmond, Wash. Alternatively, OS 210 can also be an alternative operating system, such as the previously mentioned operating systems.

Client-Server Database Management System

Figure 3:
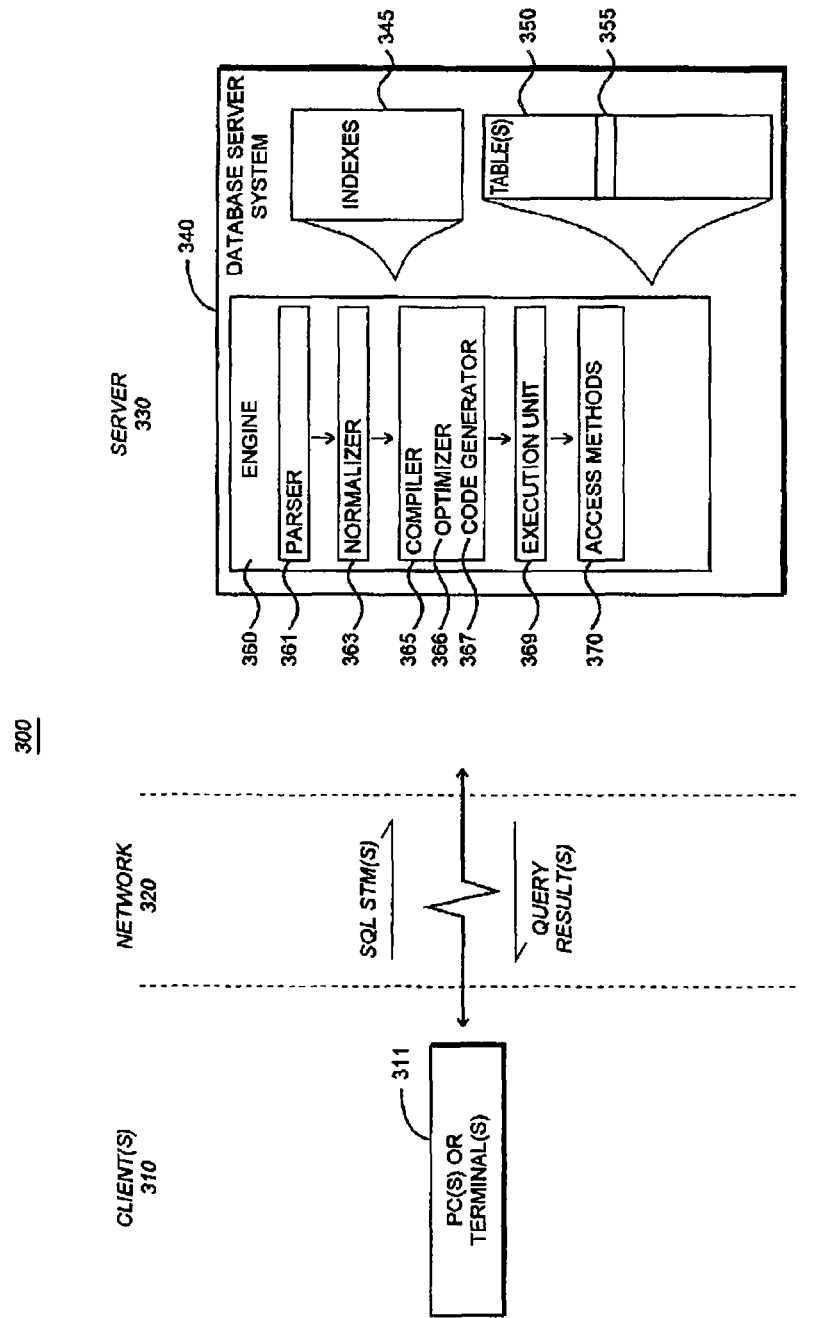
FIG. 3 illustrates the general structure of a client/server database system suitable for implementing the present invention.

While the present invention may operate within a single (standalone) computer (e.g., system 100 of FIG. 1), the present invention is preferably embodied in a multi-user computer system, such as a client/server system. FIG. 3 illustrates the general structure of a client/server database system 300 suitable for implementing the present invention. As shown, the system 300 comprises one or more client(s) 310 connected to a server 330 via a network 320. Specifically, the client(s) 310 comprise one or more standalone terminals 311 connected to a database server system 340 using a conventional network. In an exemplary embodiment, the terminals 311 may themselves comprise a plurality of standalone workstations, dumb terminals, or the like, or comprise personal computers (PCs) such as the above-described system 100. Typically, such units would operate under a client operating system, such as a Microsoft (registered trademark) Windows client operating system (e.g., Microsoft (registered trademark) Windows 95/98, Windows 2000, or Windows XP).

The database server system 340, which comprises Sybase (registered trademark) Adaptive Server (registered trademark) Enterprise (available from Sybase, Inc. of Dublin, Calif.) in an exemplary embodiment, generally operates as an independent process (i.e., independently of the clients), running under a server operating system such as Microsoft (registered trademark) Windows NT, Windows 2000, or Windows XP (all from Microsoft Corporation of Redmond, Wash.), UNIX (Novell), Solaris (Sun), or Linux (Red Hat). The network 320 may be any one of a number of conventional network systems, including a Local Area Network (LAN) or Wide Area Network (WAN), as is known in the art (e.g., using Ethernet, IBM Token Ring, or the like). The network 320 includes functionality for packaging client calls in the well-known Structured Query Language (SQL) together with any parameter information into a format (of one or more packets) suitable for transmission to the database server system 340.

Client/server environments, database servers, and networks are well documented in the technical, trade, and patent literature. In operation, the client(s) 310 store data in, or retrieve data from, one or more database tables 350, as shown at FIG. 3. Data in a relational database is stored as a series of tables, also called relations. Typically resident on the server 330, each table itself comprises one or more "rows" or "records" (tuples) (e.g., row 355 as shown at FIG. 3). A typical database will contain many tables, each of which stores information about a particular type of entity. A table in a typical relational database may contain anywhere from a few rows to millions of rows. A row is divided into fields or columns; each field represents one particular attribute of the given row. A row corresponding to an employee record, for example, may include information about the employee's ID Number, Last Name and First Initial, Position, Date Hired, Social Security Number, and Salary. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed. Thus, a typical record includes several categories of information about an individual person, place, or thing. Each row in a table is uniquely identified by a record ID (RID), which can be used as a pointer to a given row.

Most relational databases implement a variant of SQL. SQL statements may be divided into two categories: data manipulation language (DML), used to read and write data; and data definition language (DDL), used to describe data and maintain the database. DML statements are also called queries. In operation, for example, the clients 310 issue one or more SQL commands to the server 330. SQL commands may specify, for instance, a query for retrieving particular data (i.e., data records meeting the query condition) from the database table(s) 350. In addition to retrieving the data from database server table(s) 350, the clients 310 also have the ability to issue commands to insert new rows of data records into the table(s), or to update and/or delete existing records in the table(s).

SQL statements or simply "queries" must be parsed to determine an access plan (also known as "execution plan" or "query plan") to satisfy a given query. In operation, the SQL statements received from the client(s) 310 (via network 320) are processed by the engine 360 of the database server system 340. The engine 360 itself comprises a parser 361, a normalizer 363, a compiler 365, an execution unit 369, and access methods 370. Specifically, the SQL statements are passed to the parser 361 which converts the statements into a query tree—a binary tree data structure which represents the components of the query in a format selected for the convenience of the system. In this regard, the parser 361 employs conventional parsing methodology (e.g., recursive descent parsing).

The query tree is normalized by the normalizer 363. Normalization includes, for example, the elimination of redundant data. Additionally, the normalizer 363 performs error checking, such as confirming that table names and column names which appear in the query are valid (e.g., are available and belong together). Finally, the normalizer 363 can also look-up any referential integrity constraints which exist and add those to the query.

After normalization, the query tree is passed to the compiler 365, which includes an optimizer 366 and a code generator 367. The optimizer 366 is responsible for optimizing the query tree. The optimizer 366 performs a cost-based analysis for formulating a query execution plan. The optimizer will, for instance, select the join order of tables (e.g., when working with more than one table), and will select relevant indexes (e.g., when indexes are available). The optimizer, therefore, performs an analysis of the query and selects the best execution plan, which in turn results in particular access methods being invoked during query execution. It is possible that a given query may be answered by tens of thousands of access plans with widely varying cost characteristics. Therefore, the optimizer must efficiently select an access plan that is reasonably close to an optimal plan. The code generator 367 translates the query execution plan selected by the query optimizer 366 into executable form for execution by the execution unit 369 using the access methods 370.

All data in a typical relational database system is stored in pages on a secondary storage device, usually a hard disk. Typically, these pages may range in size from 1 Kb to 32 Kb, with the most common page sizes being 2 Kb and 4 Kb. All input/output operations (I/O) against secondary storage are done in page-sized units—that is, the entire page is read/written at once. Pages are also allocated for one purpose at a time: a database page may be used to store table data or used for virtual memory, but it will not be used for both. The memory in which pages that have been read from disk reside is called the cache or buffer pool.

I/O to and from the disk tends to be the most costly operation in executing a query. This is due to the latency associated with the physical media, in comparison with the relatively low latency of main memory (e.g., RAM). Query performance can thus be increased by reducing the number of I/O operations that must be completed.

This can be done by using data structures and algorithms that maximize the use of pages that are known to reside in the cache. Alternatively, it can be done by being more selective about what pages are loaded into the cache in the first place. An additional consideration with respect to I/O is whether it is sequential or random. Due to the construction of hard disks, sequential I/O is much faster then random access I/O. Data structures and algorithms encouraging the use of sequential I/O can realize greater performance.

For enhancing the storage, retrieval, and processing of data records, the server 330 maintains one or more database indexes 345 on the database tables 350. Indexes 345 can be created on columns or groups of columns in a table. Such an index allows the page containing rows that match a certain condition imposed on the index columns to be quickly located on disk, rather than requiring the engine to scan all pages in a table to find rows that fulfill some property, thus facilitating quick access to the data records of interest. Indexes are especially useful when satisfying equality and range predicates in queries (e.g., a column is greater than or equal to a value) and "order by" clauses (e.g., show all results in alphabetical order by a given column).

A database index allows the records of a table to be organized in many different ways, depending on a particular user's needs. An index key value is a data quantity composed of one or more fields from a record which are used to arrange (logically) the database file records by some desired order (index expression). Here, the column or columns on which an index is created form the key for that index. An index may be constructed as a single disk file storing index key values together with unique record numbers. The record numbers are unique pointers to the actual storage location of each record in the database file.

Indexes are usually implemented as multi-level tree structures, typically maintained as a B-Tree data structure. Pointers to rows are usually stored in the leaf nodes of the tree, so an index scan may entail reading several pages before reaching the row. In some cases, a leaf node may contain the data record itself. Depending on the data being indexed and the nature of the data being stored, a given key may or may not be intrinsically unique. A key that is not intrinsically unique can be made unique by appending a RID. This is done for all non-unique indexes to simplify the code for index access. The traversal of an index in search of a particular row is called a probe of the index. The traversal of an index in search of a group of rows fulfilling some condition is called a scan of the index. Index scans frequently look for rows fulfilling equality or inequality conditions; for example, an index scan would be used to find all rows that begin with the letter 'A'.

The above-described computer hardware and software are presented for purposes of illustrating the basic underlying desktop and server computer components that may be employed for implementing the present invention. For purposes of discussion, the following description will present examples in which it will be assumed that there exists a "server" (e.g., database server) that communicates with one or more "clients" (e.g., personal computers such as the above-described system 100). The following discussion also uses examples of queries requesting information from XML documents stored in a database system; however, the present invention may also be used in conjunction with documents written in various other markup languages, including, but not limited to, cHTML, HTML, and XHTML. The present invention, however, is not limited to any particular environment or device configuration. In particular, a client/server distinction is not necessary to the invention, but is used to provide a framework for discussion. Instead, the present invention may be implemented in any type of system architecture or processing environment capable of supporting the methodologies of the present invention presented in detail below.

Overview of Execution of Functions in XML Queries

The present invention comprises a system providing methodology for representing markup language (e.g., XML) document data in a searchable format in a database system. The following discussion focuses on an XML document; however the system and methodology of the present invention may also be used for other types of markup language or tag-delimited sources of information. Accordingly, the references to XML in the following discussion are used for purposes of illustration and not limitation.

Tree Representation of Sample XML Document

XML is a widely accepted model for representing data. In recent years, XML has become pervasive both in representing stored data and communicating data over a network. The following discussion illustrates the operations of the present invention using several examples of an XML document including books in a bookstore. A simple example of an XML document is as follows:

```
<bookstore>
<book>
<book publisher= "MGH">
    <title>Trenton...</title>
    <author>
        <fname>Mary</fname>
        <lname>Bob</lname>
    </author>
</book>
<book>
<book publisher= "AW">
    <title>National...</title>
    <author>
        <fname>Joe</fname>
        <lname>Bob</lname>
    </author>
</book>
</bookstore>
```

Tree Representation of Sample XML Document

Figure 4:
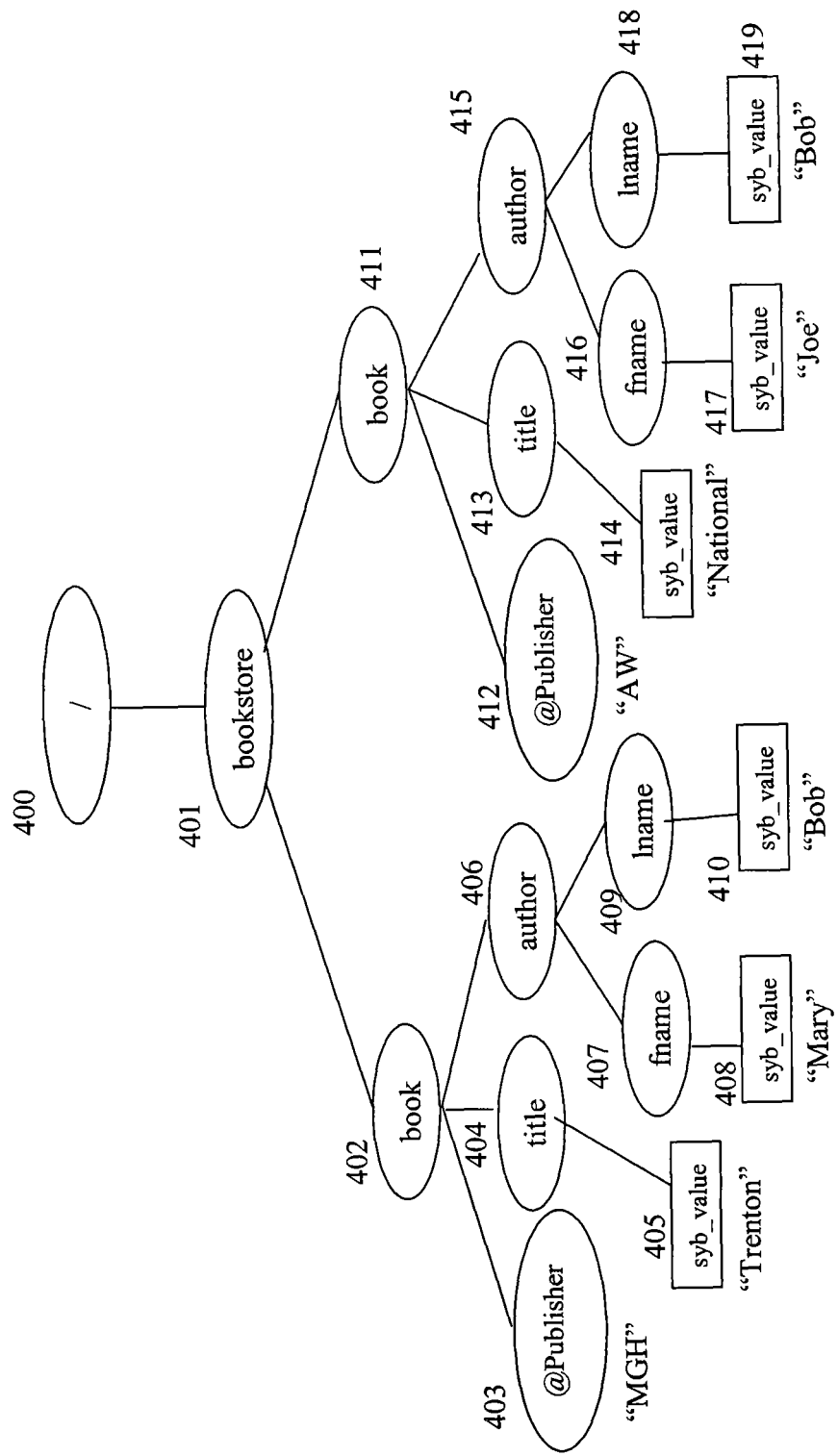
FIG. 4 is a block diagram illustrating a tree representation of an XML document.

Unlike conventional data in a relational database which is maintained in a flat structure, information in an XML document is usually maintained in a tree structure. FIG. 4 is a block diagram illustrating a tree representation of the above XML document. As shown at FIG. 4, each element or value in the XML document has been converted to a node in the tree. These nodes are numbered in a pre-determined manner. The number corresponding to each node is called a "node id" of the element or tree node. This concept of node id is important in XML query processing. As shown, nodes of the tree include a bookstore 401, a first book 402, and a second book 411. Children nodes of book 402 provide access to additional information regarding each book, including publisher 403, title 404, and author 406, including author first name (fname) 407 and author last name (lname) 409. Book 411 similarly has associated children nodes 412, 413, 415, 416, and 418. As shown, the title, first name (fname), and last name (lname) nodes of each book have associated data values.

As previously described, XPath is a query language for querying data in XML documents. An example of an XPath query for requesting data in the above example XML document is as follows:

/bookstore/book/title

An example of a SQL version of the above XPath query that can be used in the currently preferred embodiment of the system of the present invention is as follows:

{select xmlextract('/bookstore/book/title', xmlcol) from bookstoretable} where "xmlextract' represents a built-in function of ASE SQL to run the XPATH query. The above XPath query would return the following answer based on the example XML document shown above:

Answer: <title> Trenton </title><title> National</title>

Another example of an XPath query is:

/bookstore/book[title='Trenton']/author/lname

A SQL version of this query is as follows:

{select xmlextract('/bookstore/book[title='Trenton']/author/lname', xmlcol) from bookstoretable}

As shown, the above SQL query specifies the path from which data is to be selected (in the form select xmlextract (path)) as well as the column name (xmlcol) and table (bookstoretable). Also, in the above query the "[" operator (or "square bracket" operator) provides for filtering out books based on comparing the title of the book to 'Trenton'. This operator corresponds to a "where" clause in a SQL query. The last name of the author of such books is then projected. The above query would return the following answer based on the example XML document shown above:

Answer: <lname> Bob </lname>

System Components

Implementation Environment

Figure 5:
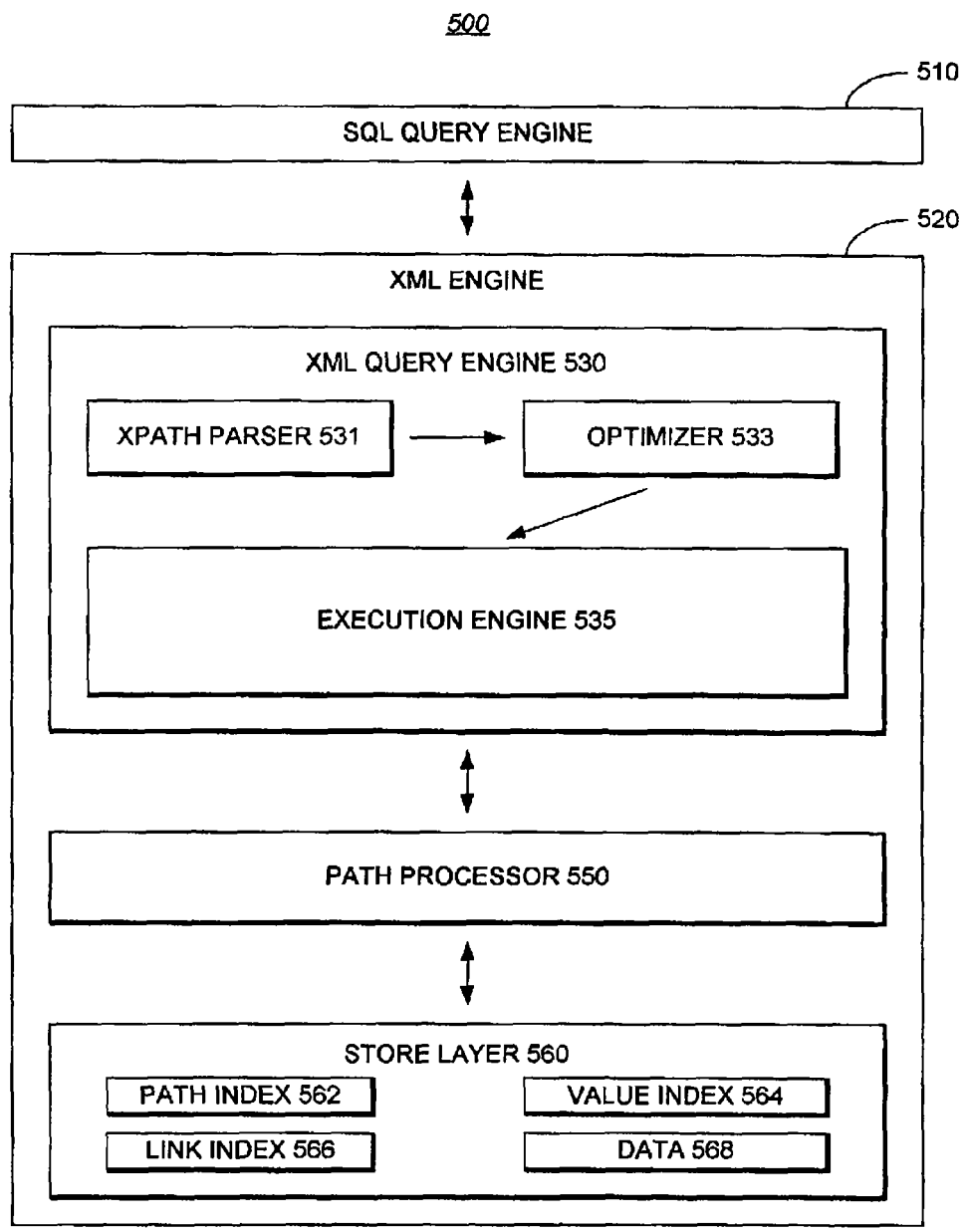
FIG. 5 is a block diagram illustrating an environment in which the present invention may be implemented.

FIG. 5 is a block diagram illustrating an environment 500 in which the present invention may be implemented. The environment 500 includes an SQL Query Engine 510 and an XML Engine 520. The XML Engine 520 provides mechanisms for storage and retrieval of information in the XML format. As shown at FIG. 5, the XML Engine 520 includes as core components an XML Query Engine 530, a Path Processor 550, and a Store Layer 560.

The XML Engine 520 includes parse time functionality that transforms each XML document into a collection of bytes that can be stored in a database or file system. Furthermore, a streaming interface over this data is defined to provide fast, random access to the structures within it. The streaming interface includes a fast access structure, which is a flexible interface that enables free movement amongst, and efficient access to the underlying XML data. The XML Engine 520 also has query execution-time functionality for retrieving data in response to queries.

As shown at FIG. 5, an XPath query may be transmitted to the XML Engine 520 by the SQL Query Engine 510. For instance, a user may submit the following SQL query requesting information from the database:

{select xmlextract('/bookstore/book[title='Trenton']/author/lname', xmlcol) from bookstoretable}

From the above query, the SQL Query Engine 510 extracts the following XPath portion of the above expression and sends it to the XML Query Engine 530:

/bookstore/book[title='Trenton']/author/lname

The XPath portion of the query is handled by the XML Query Engine 530, which includes query execution-time functionality for retrieving data in response to queries. The XML Query Engine 530 includes an XPath parser 531, an optimizer 533, and an execution engine 535. Within the XML Query Engine 530, the XPath parser 531 parses the XPath portion of the query received from the SQL Query Engine 510 and converts it into a query tree representation. The XPath parser 531 includes a normalization module (not separately shown at FIG. 5) for normalization of the XPath expression. The query tree representation generated by the XPath parser 531 is then sent to the optimizer 533 which generates a physical query plan (execution plan) for execution of the query. The query plan is then provided to the execution engine 535 which interprets the query plan and executes it with the support of the store layer 560. It should be noted that although the original query submitted by the user appears to only include a single path, execution of the query plan may break this expression into multiple paths. For instance, a first path may try to extract all the titles while another path may extract the last names, and so on and so forth.

The Path Processor 550 serves as an interface between the XML Query Engine 530 and the Store Layer 560. The Path Processor 550 is an abstract API which accepts path requests from the XML Query Engine 530 and returns back node ids (corresponding to persisted nodes of the XML document). The Path Processor 550 invokes services of the Store Layer 560 to identify the nodes that satisfy the query expression (e.g., XPath expression) and returns an instance of an abstract object named "Dompp". This Dompp object is returned back to the query layer (i.e., XML Query Engine 530).

The XML Query Engine 530 uses various services of the Dompp such as getvalue( ) and/or compare( ) to compute the results of the query. However, the XML Query Engine 530 is not aware of the node ids stored in Dompp. In other words, Dompp acts as a medium to carry node ids through various components of the system.

One role of the XML Engine 520 is to transform an XML document for storage in a database. The XML Engine 520 transforms an XML document by analyzing the document as a tree. As described previously with reference to FIG. 4, an XML document can be viewed as a graph where: (1) each element is a node; (2) the text or value (e.g., the value "Mary" as the first name of an author) associated with an element is a leaf node; (3) each attribute (e.g., Style=textbook) is a leaf node; (4) each node is labeled uniquely; and (5) all nodes are labeled in the order they occur in the source document.

During the transformation process, each node is labeled uniquely by assigning an integer to each node in a monotonically increasing order. This integer is referred to as object ID or OID. During this process, each element of the source document is visited in turn and each element is numbered based upon the order it occurs in the document. An object is created by the XML Engine 520 which contains data from the transformed document together with auxiliary structures to aid in faster access to the data. During the transformation process, each element of an XML document is treated as a node or leaf (i.e., terminal node) and these nodes and leaves are annotated to provide faster access to data. The structure of the tree itself is derived from the structure of the source document.

The Store Layer 560 of the XML Engine 520 converts the text representation into an internal representation which is efficient for storage. The Store Layer 560 is also responsible for converting the representation to its textual form when the Path Processor 550 (path processing layer) requests a certain piece of information during query processing.

XML data is stored in the database system in an image column in a parsed format, or in the text, or in image columns as "raw" XML. XML document parsing is a fundamental operation in any XML query processing system. However, parsing is a very resource intensive and time-consuming operation as compared to most of the query processing activities. In order to avoid query execution-time parsing overheads, storage of pre-parsed XML documents is utilized. The parsing is achieved through a built-in function, xmlparse( ). The output of xmlparse( ) is an internal format for parsed-XML representation. This format is based on the structures built in memory during parsing. In accordance with the present invention, the format has changed over the prior art in order to reduce the storage requirements and improve performance.

Referring to FIG. 6A, as presented in commonly-owned U.S. Pat. No. 6,799,184 titled "Relational Database System Providing XML Query Support", prior to the present invention, the format of the parsed document included a header 601, a path index 602 (which includes the value index), a link index 603, an OID-Offset table 604, and SybNode data 605. The header of each SybXMLStream object contained a "magic" (i.e., system-discernible) string identifying that the stream is XML data that has been transformed. Each header also contained a status indicator, path index offset, link index offset, OID-Offset table offset, and the SybNode offset.

Next, the prior art path index 602 contained a list of object identifiers ("OIDs" or "object IDs") for every unique path in the transformed XML document. These OIDs were stored in the order of occurrence in the source XML document. The path index was sorted on paths. An example of the prior art path index structure is illustrated at FIG. 6B. The prior art path index 602 included the number of entries 621 and certain information on each entry. This information included pathname 622, node type 623, number of nodes 624, object IDs (OIDs) 625, and offsets 626, as shown at FIG. 6B. The value index is physically part of the path index.

Prior art offsets were stored in the path index only for the leaf nodes in the sorted order of values. Non-leaf nodes did not have offsets stored. These offsets are the offsets for the data in the prior art SybNode data 605 of the SybXMLStream (as described below). The value index was used in pointed queries and range queries. The object IDs are stored in the order they are found in the source document. The offsets are stored in alphabetical or sorted order in the value index based upon the underlying values associated with the offsets.

The prior art link index 603 maintains the parent-child relationship that exists between nodes of the tree. The structure of an exemplary prior art link index 603 is illustrated at FIG. 6C. As shown, the prior art link index 603 lists the node by its parent object ID (or POID) number 631. The prior art link index also lists the number of children (#children) 632 of each node and the object IDs of each of these children (child OID) 633. The prior art link index 603 enabled the children of a given node to be located and was used at query execution time to form the result XML fragment which was returned in response to a query.

FIG. 6D illustrates the structure of a prior art SybNode data 605. As shown at FIG. 6D, the following prior art SybNode information was typically stored for every element: status 641, node type 642, sub-node type 643, object ID (OID) 644, parent object ID (POID) 645, node name 646, and node value 647. The node value had valid data only for leaf nodes. The node type could be an element node, an attribute node, comment node, or the like, which describes the node type. In the prior art, the sub-node type was specified only for attribute elements.

FIG. 6E illustrates the structure of the prior art OID-Offset table 604. For every node (which is identified by OID 651), two offsets in the stream were stored in the OID-Offset table as illustrated at FIG. 6E. The first offset was the link offset 652 for the link index information for the parent-child relationship. The link offset 652 was from the start of the link index. The second offset was the node offset 653 for SybNode information or, in other words, the data. Node offset 653 was numbered from the start of the SybNode information. The prior art OID-Offset table 604 helped to provide random access on the stream.

During the parsing and transformation process in the prior art, various indices and SybNode data were built. Whenever a path was encountered, it was inserted into the path index. Parent-child relationships were inserted into the link index. SybNode offsets were inserted for corresponding object IDs and the SybNode object was written into the SybXML-Stream. When the end of the XML document was reached (i.e., at the end of parsing and transforming an XML document), all nodes in the tree had been visited. At that point the link offset was calculated and filled in for each OID in the OID-Offset table. A byte array was formed from the header, the three indices, the OID-offset table and the SybNode data. An input stream was created from the byte array and was returned. This input stream was a SybXMLStream object, which included the SybXMLData and a stream on this data providing random access.

While the SybXMLStream of the prior art provided a sufficient format, as the size of the XML file becomes bigger and bigger, a more concise format is needed to reduce the size of the native XML binary in the database table. In accordance with the present invention, a new format for the parsed representation of an XML document is provided that satisfies this need by removing the OID-Offset field, introducing a symbol table for element names, compacting the path index field, compacting the link index field and breaking it into fixed and variable portions, compacting the SybNodes field and making the entries fixed size, and optimizing the field sizes based on a maximum value for each field, as described further herein below. These improvements result in the ability to automatically calculate offsets, so as to avoid needing to write them to disk. Also, string data is factored in one place with numeric references to the locations of the string data able to be utilized instead, resulting in better speed and space savings. As presented herein, with the new SybXMLStream object format of the present invention ("XMLStream"), improved performance can be realized while reducing storage requirements. By way of example, reductions in storage requirements of up to about 50% have been seen in testing results.

FIG. 7A shows a high-level structure diagram of an XML-Stream object format for parsed representation of XML documents in accordance with the present invention. The fields/sections of the object format include Document Header 701, Symbol Table (SymbolTab) 703, White-Space Symbol Table (WS-SymbolTab) 705, Path Index 707, Link Index Fixed 709, Link Index Variable 711, Node Data Fixed (SybNodesFixed) 713 and String Values (SybValues) 715.

The Document Header 701 includes a "magic" string (i.e., a system-discernible) string identifying that the stream is XML data that has been transformed and providing information regarding the byte ordering of the data. For example, the first four bytes of this string may be fixed, as "SYBX", with two remaining bytes to indicate encode byte ordering for the platform on which parsing is done, e.g., byte 5 may be used to indicate ordering of short numbers and byte 6 for integers. The header further includes version, document length, a status indicator, and offset data for the other sections of the XMLStream, as is well understood in the art.

Following the header is the Symbol Table 703, which is an array of the element names extracted from the XML document. The introduction of the Symbol Table 703 is done to improve storage needs and improve performance. For example, given that storage of string elements requires 2 bytes for each character and an integer field to specify how many characters there are, strings can use a lot of memory space. Of course, repeating strings requires additional memory usage. Through the use of the Symbol Table 703 as an extraction of the string elements, the memory usage is reduced, while improved performance can be realized, such as by speeding up computations like equality checks based on computation on their index values. Given the nature of string data, each entry in Symbol Table 703 is of variable size. FIG. 7B illustrates the array of elements (ElemName1, ElemName2 . . . ) that forms the Symbol Table 703.

Also included is a WS-Symbol Table 705, which is an array of the unique whitespace data extracted from the XML document, e.g., carriage return, tab, etc. As is readily appreciated, whitespaces (referring to a sequence of contiguous whitespace characters) are often repeated throughout an XML document. By factoring them into a separate symbol table, space and access are optimized. The entries are of variable length. FIG. 7C represents the array as entries Whitespace1, Whitespace2 . . . .

The Path Index 707 contains a list of path entries, as represented in FIG. 7D. The Path Index 707 includes a first value to indicate the number of entries in the Path Index (an INTEGER quantity). Each entry in the Path Index 707 is of variable size. In providing the Path Index 707, a given path to be included is represented based upon the other path data extracted from the XML document. Recognizing that as paths are indexed, a given path, such as '/bookstore/book/', would be partially represented by a parent path, '/bookstore/', in the Path Index 707, a given path is represented by two INTEGER values in the Path Index 707, the index of the last element of the path ('book') in the Symbol Table 703 and the index of the parent path ('/bookstore/') in the Path Index 707. The fields for these values are shown as name-idx and parentpath-idx, respectively. A node type (INTEGER value, described below) field is included and specifies the type of the node in the given path. An INTEGER is also used to specify the number of nodes conforming to the path (#nodes). INTEGERs are also used to list the Node IDs (OIDs) of all the nodes that conform to the path.

The link index data provides all of the parent and children relationships. Since the number of children of each node is different, the structure of each link index entry can be irregular. To avoid this problem, the link index is divided in two parts. The first part, LinkIndexFixed 709, shown in FIG. 7E, simply contains entries indicating the number of children of each node and the offset to find its children list. The second part, LinkIndexVariable 711, shown in FIG. 7F, contains a list of variable-sized entries that identify the offset ids for each child node (coid1, coid2, . . . ) and an endmark. All of these entries in 709 and 711 are INTEGER quantities.

As its names implies, the SybNodesFixed 713 section includes fixed size entries. Each node in the SybNodesFixed 713 is represented by five values, as shown in FIG. 7G. The status field is a short INTEGER containing status of the node, where, for example, 0x0001 indicates an internal node, i.e. it has a child, 0x0002 indicates a leaf node, and 0x0004 indicates that the node contains a predefined entity. In an embodiment, nodetype is represented by a byte value specifying the type of a node. For example, the values for different node types may be provided as:

| | |
|---|---|
| 0 | Document Root Node |
| 1 | Element Node |
| 2 | Attribute Node |
| 3 | Text Node |
| 4 | Comment Node |

| | |
|---|---|
| 5 | Processing Instruction Node |
| 6 | Element White-space. |

Of course, other node types and values may be used without departing from the spirit and scope of the present invention. Further included is a field for a node identifier of the parent node (parentoid), represented as an INTEGER value. The INTEGER value for the index of the node in the Symbol Table 703 (name-idx) is also included. A mixed value offset value is also included as an INTEGER value such that if the node is a leaf node, then this is the offset to the value in the SybValues section 715 or if the node is an internal node, then this is the offset to the LinkIndexFixed 709 section for this node. In this manner, storage of the node offset for a leaf node or the node offset to the link index portion for an internal node can be achieved via the same field to optimize space and access to this information. Note that if it is a leaf node containing a whitespace value, then this offset is actually the index of the whitespace in the whitespace symbol table (WS-Symbol Table 705).

The SybValues section 715 shown in FIG. 7H lists the variable length strings for the element/attribute node data. This field simply contains all the string values extracted from the XML document. For example, the string values for the example document of FIG. 4 are 'MGH', 'Trenton', 'Mary', 'Bob', 'AW', 'National', 'Joe', and 'Bob'.

An end mark (not shown) may be used to indicate the end of the XMLStream object, for example, marking with 0xff.

In a preferred embodiment, the sizes of the fixed-size sections of the XMLStream object are determined based upon a maximum value to be represented in the given section. For example, if the number of OIDs<255, then the fixed-size can be one byte in length. For values<65025, then two bytes can be used. And so on, as is well understood in the art.

Figure 8:
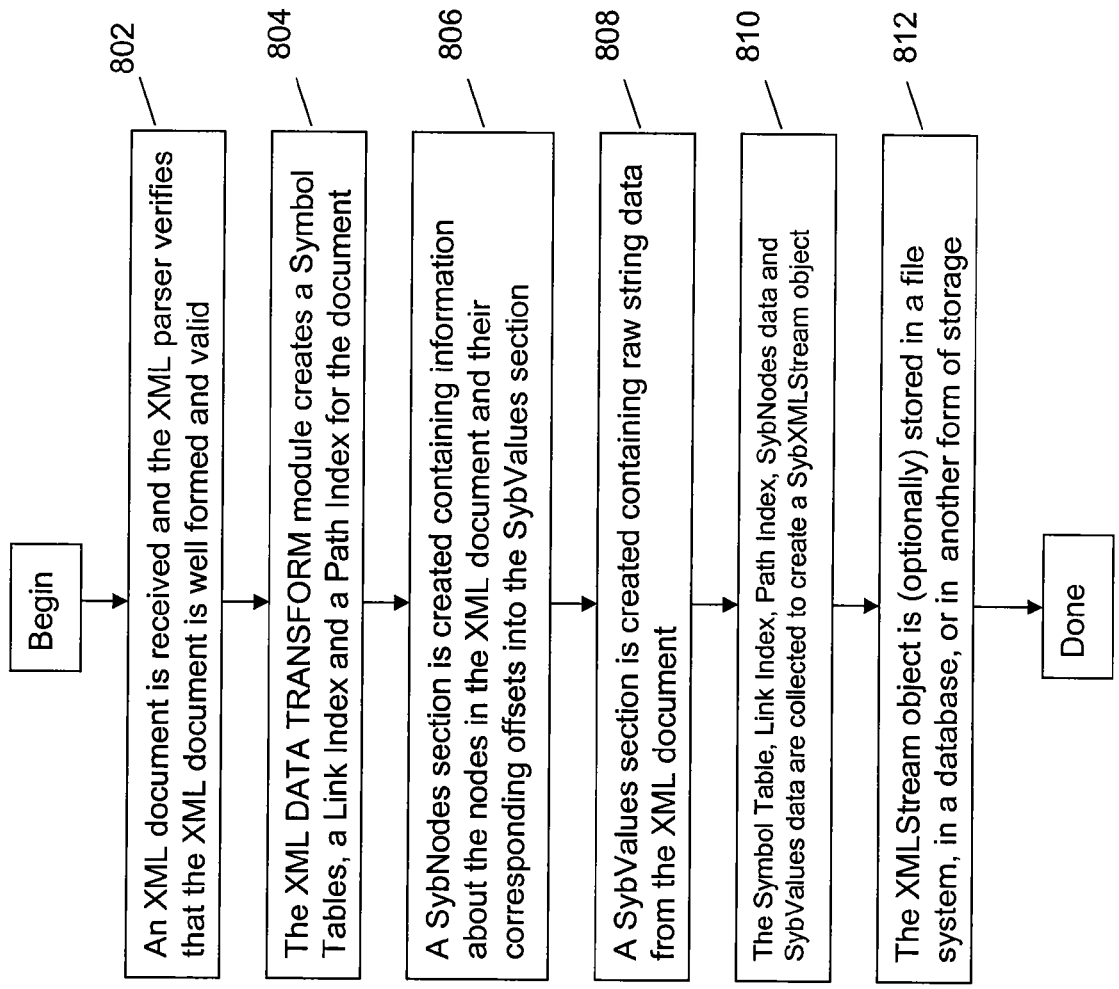
FIG. 8 provides a block flow diagram illustrating the operations of the XML Store Engine in transforming an XML document into a XMLStreamObject in accordance with the present invention.

FIG. 8 provides a flowchart illustrating the operations of the XML Store Engine in transforming a markup language, e.g., an XML, document into a XMLStream object of the present invention, enabling such transformed object to be used to provide random access to information of interest in the source XML document. The method may be implemented using processor-executable instructions, for directing operation of a device under processor control. The processor-executable instructions may be stored on a computer-readable medium, such as CD, DVD, flash memory, or the like. The processor-executable instructions may also be stored as a set of downloadable processor-executable instructions, for example, for downloading and installation from an Internet location (e.g., Web server).

The transformation process begins when a source document in XML form is received. At block 802, the source document is fed into the XML parser of the XML Store Engine. The XML parser verifies that the source XML document is well formed and valid. An XML document is well formed when every element is the child of only one parent element. An XML document is valid when its elements conform to the document's data type definition.

If the source document is well formed and valid, at block 804 the XML data transform module uses callbacks to create a symbol table (703), a path index (707) and a link index (709, 711). The transformation process treats each element of the source document as a node or leaf node of a tree as previously described.

At block 806, a SybNodesFixed section 713 is created containing information about the nodes in the XML document and their corresponding offsets in the SybValues section 715.

At block 808, the SybValues section 715 is created containing raw string data from the XML document. At block 810, the symbol table sections 703, 705, path index section 707, link index sections 709, 711, SybNodesFixed section 713 and SybValues section 715 data are collected to create a XMLStream object.

At block 812, the XMLStream object is stored in a file system, in a database, or in another form of persistent storage. The XMLStream object may also be retained in system memory. The XMLStream object can be used to provide more efficient access to data within the source XML document.

In accordance with the present invention, improved performance with reduced storage requirements are realized from the resulting XMLStream object that utilizes fixed size entries together with an extracted symbol table that allows for automatic calculation of offsets. The XMLStream object provides an interface or structure enabling random access to the data from the source document. This interface also enables the system to bring only the relevant portion of the transformed document into memory in response to a query seeking to retrieve information within the source document.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A computer-implemented method for representing markup language document data in a searchable format, comprising:

parsing a markup language document into a data stream, wherein the data stream includes:
  a plurality of fields in a predefined format having a symbol table for at least one of the fields, wherein offset values for fields of the data stream are calculated automatically and without requiring storage in the data stream, and
  optimized field sizes based on a maximum value of data within each field; and
storing the data stream in data storage.

2. The computer-implemented method of claim 1, wherein the parsing includes referencing entries of the symbol table within a path index field of the data stream.

3. The computer-implemented method of claim 2, wherein the path index field comprises a list of path entries that reference parent path data in the path index field.

4. The computer-implemented method of claim 1, wherein the data stream farther comprises a link index field that includes a fixed data portion and a variable data portion.

5. The computer-implemented method of claim 4, wherein the data stream farther comprises a nodes field with fixed size entries that utilizes an index value to reference a node element in the symbol table or to reference a fixed data portion of the link index field.

6. The computer-implemented method of claim 1, wherein the symbol table comprises an array of element names for each unique node element of the markup language document.

7. The computer-implemented method of claim 1, wherein having a symbol table for at least one field of the data stream further comprises having a whitespace symbol table for contiguous whitespace characters of the markup language document.

8. The computer-implemented method of claim 1, wherein the data stream resulting from the parsing includes a plurality of index fields, based on contents of the markup language document, configured to facilitate retrieval of the markup language document data.

9. A system for representing markup language document data in a searchable format, composing:
  one or more processors;
  a module configured to parse, using the one or more processors, a markup language document into a data stream, wherein the data stream includes:
    a plurality of fields in a predefined format having a symbol table for at least one of the fields, wherein offset values for fields of the data stream are calculated automatically and without requiring storage in the data stream, and
    optimized field sizes based on a maximum value of data within each field; and
  a module configured to store, using the one or more processors, the data stream in data storage.

10. The system of claim 9, wherein a path index field of the data stream references the symbol table.

11. The system of claim 10, wherein the path index field comprises a list of path entries that reference parent path data in the path index field.

12. The system of claim 9, wherein the data stream further comprises a link index field that includes a fixed data portion and a variable data portion.

13. The system of claim 12, wherein the data stream further comprises a nodes field with fixed size entries that utilizes an index value to reference a node element in the symbol table or to reference a fixed data portion of the link index field.

14. The system of claim 9, wherein the symbol table comprises an array of element names for each unique node element of the markup language document.

15. The system of claim 9, wherein having a symbol table for at least one field of the data stream further comprises having a whitespace symbol table for contiguous whitespace characters of the markup language document.

16. The system of claim 9, wherein the data stream resulting from the parsing includes a plurality of index fields, based on contents of the markup language document, configured to facilitate retrieval of the markup language document data.

17. A non-transitory computer usable medium having computer program logic stored thereon that when executed by a processor, causes the processor to perform operations to represent markup language document data in a searchable format, the operations comprising:
  parsing a markup language document into a data stream, wherein the data stream includes:
    a plurality of fields in a predefined format having a symbol table for at least one of the fields, wherein the parsing includes enabling offset values for fields of the data stream to be calculated automatically and without requiring storage in the data stream, and
    optimized field sizes based on a maximum value of data within each field; and
  storing the data stream in data storage.

18. The non-transitory computer usable medium of claim 17, wherein the parsing includes referencing entries of the symbol table within a path index field of the data stream.

19. The non-transitory computer usable medium of claim 18, wherein the path index field comprises a list of path entries that reference parent path data in the path index field.

20. The non-transitory computer usable medium of claim 17, wherein the data stream further comprises a link index field that includes a fixed data portion and a variable data portion.

21. The non-transitory computer usable medium of claim 20, wherein the data stream further comprises a nodes field with fixed size entries that utilizes an index value to reference a node element in the symbol table or to reference a fixed data portion of the link index field.

22. The non-transitory computer usable medium of claim 20, wherein having a symbol table for at least one field of the data stream further comprises having a whitespace symbol table for contiguous whitespace characters of the markup language document.

23. The non-transitory computer usable medium of claim 17, wherein the data stream resulting from the parsing includes a plurality of index fields, based on contents of the markup language document, configured to facilitate retrieval of the markup language document data.

* * * * *